United States Patent [19]

Minezawa et al.

[11] Patent Number: 5,412,293

[45] Date of Patent: May 2, 1995

[54] POWER SUPPLY FOR MOTOR USABLE WITH AN ELECTRIC VEHICLE

[75] Inventors: Yukihiro Minezawa, Okazaki; Hitoshi Dohkoshi, Sapporo, both of Japan

[73] Assignee: Kabushiki Kaisha Equos Research, Tokyo, Japan

[21] Appl. No.: 236,156

[22] Filed: May 2, 1994

Related U.S. Application Data

[63] Continuation of Ser. No. 977,073, Nov. 16, 1992, abandoned.

[30] Foreign Application Priority Data

Nov. 18, 1991 [JP] Japan .................. 3-328287

[51] Int. Cl.⁶ .................................. H02P 3/00
[52] U.S. Cl. ............................. 318/376; 318/139
[58] Field of Search ............... 318/139, 141, 145, 151, 318/153, 138, 251, 439, 430, 375–378, 759, 769, 799–801; 307/18–23, 16.7, 46–49, 37, 45, 66, 87; 180/2.1, 53.5, 170

[56] References Cited

U.S. PATENT DOCUMENTS

| | | | |
|---|---|---|---|
| 3,560,818 | 2/1971 | Amato | 318/138 |
| 3,714,533 | 1/1973 | Unnwehr | 318/254 |
| 4,056,764 | 11/1977 | Endo et al. | 318/139 X |
| 4,100,427 | 7/1978 | Durand et al. | 318/430 |
| 4,287,936 | 8/1981 | Bailey et al. | 318/375 |
| 4,330,742 | 5/1982 | Reimers | 318/139 X |
| 4,384,240 | 5/1983 | Sloan | 318/139 X |
| 4,465,955 | 8/1984 | Lössel et al. | 318/139 |
| 4,787,021 | 11/1988 | Hobari et al. | 318/376 X |
| 5,091,679 | 2/1992 | Murty et al. | 318/153 |
| 5,200,644 | 4/1993 | Kobayashi et al. | 307/66 |

FOREIGN PATENT DOCUMENTS

49-37317  4/1974  Japan .

*Primary Examiner*—Jonathan Wysocki
*Attorney, Agent, or Firm*—Sandler, Greenblum & Bernstein

[57] ABSTRACT

A large-capacity capacitor (C1, C2) is connected in series and/or parallel with a battery (11). A voltage sensor (9, 10) is provided to the battery and/or the large-capacity capacitor to detect their terminal voltages. Input and output currents are limited between at least one of a motor driving circuit and the large-capacity capacitor and the battery on the basis of the detection signals from the voltage sensor. When the terminal voltage of the large-capacity capacitor is equal to or higher than a predetermined value, a current flowing from the motor driving circuit to the large-capacity capacitor is limited.

22 Claims, 11 Drawing Sheets

POWER SUPPLY FOR MOTOR USABLE WITH AN ELECTRIC VEHICLE

This application is a continuation of application Ser. No. 07/977,073, filed Nov. 16, 1992, now abandoned.

BACKGROUND OF THE INVENTION

1. Field of the Invention

The present invention relates to an electric vehicle and, more particularly, to the control of a power supply for driving a motor of an electric vehicle.

2. Description of the Related Art

In general, an electric vehicle using a motor as a power source uses a battery as a DC power supply, and electric power from the battery is supplied to an electric motor through a driving circuit to drive the motor. In order to efficiently use electric power, a regenerative braking system returns electric power generated upon braking to the battery. More specifically, a power supply apparatus is arranged, such that electric power is obtained from the battery in an acceleration or constant-speed traveling state, and is returned to the battery in a deceleration state.

SUMMARY OF THE INVENTION

It is an object of the present invention to provide an electric vehicle, which can prolong the service life of a battery by avoiding quick discharging and charging of the battery.

It is another object of the present invention to provide an electric vehicle comprising a power supply apparatus, which can prevent a battery, a capacitor, or the like from being supplied with excessive electric power.

According to the present invention, a terminal voltage of a battery is detected to limit input and output currents of the battery, thereby preventing deterioration of the battery.

The terminal voltage of a large-capacity capacitor is detected. If the capacitor is sufficiently charged, an input current to the capacitor is limited. Thus, the capacitor can be prevented from being destroyed, and the service life of the power supply apparatus in the electric vehicle can be prolonged.

BRIEF DESCRIPTION OF THE DRAWINGS

Other objects and advantages of the present invention will be sufficiently understood from the following description taken in conjunction with the accompanying drawings, in which.

DETAILED DESCRIPTION OF THE PREFERRED EMBODIMENTS

Figure 1:
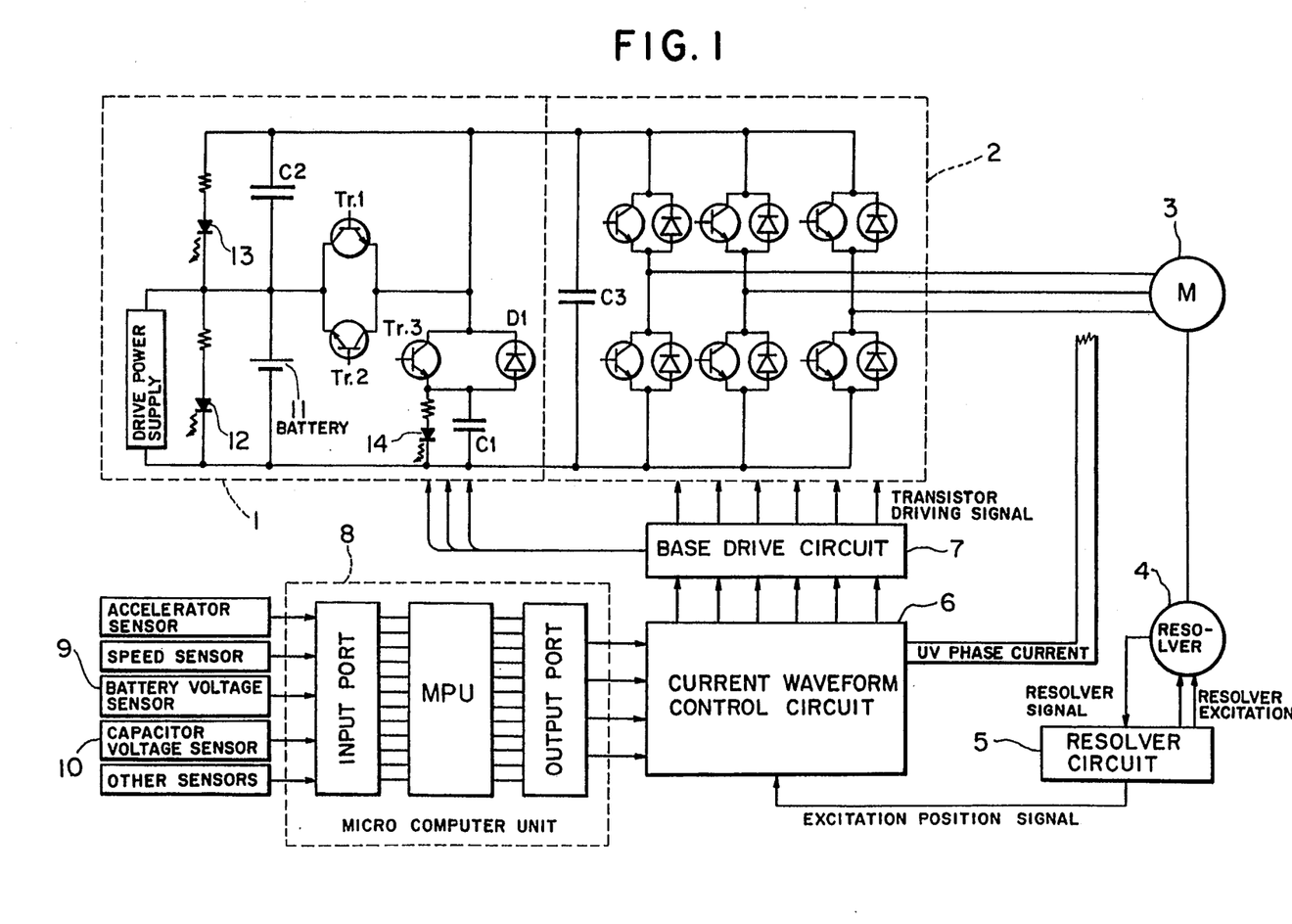
FIG. 1 is a circuit diagram showing a driving control circuit of an electric vehicle according to a first embodiment of the present invention.

FIG. 1 is a circuit diagram showing a driving control circuit of an electric vehicle according to the first embodiment of the present invention.

An electric vehicle of this embodiment comprises a DC power supply apparatus 1. Electric power supplied from the DC power supply apparatus 1 is converted into a three-phase AC voltage through an inverter 2 constituted by bridges and a smoothing capacitor, and the AC voltage is supplied to a DC brushless motor 3.

The rotating shaft of the brushless motor 3 is coupled to a driving mechanism of the vehicle, and is also connected to a resolver 4 as a rotor position detector. A resolver circuit 5 excites the resolver 4 to receive a resolver signal, and outputs a signal representing an excitation position to a current waveform control circuit 6. The current waveform control circuit 6 supplies a transistor driving signal to the power supply apparatus 1 and the inverter 2 through a base drive circuit 7.

A desired operation of the brushless motor 3, based on the excitation position signal, is performed in response to the transistor driving signal, and the power supply apparatus 1 is controlled according to a signal from a microcomputer (unit) 8, as will be described later. The microcomputer 8 receives signals from an accelerator sensor for generating a voltage according to a depression amount of an accelerator pedal, and a speed sensor for detecting the speed of the vehicle, and also receives various detection signals from a sensor 9 for detecting a battery terminal voltage, a sensor 10 for detecting a capacitor terminal voltage, and the like. As will be described later, the operation of the power supply apparatus 1 is controlled according to the signals from the sensors 9 and 10.

The arrangement of the power supply apparatus 1 in the electric vehicle of this embodiment will be described below with reference to FIG. 1. A battery 11 is connected in parallel with a light-emitting diode 12 and a power supply for the base drive circuit 7. The battery 11 is also connected in series with a capacitor C2, the capacitor C2 being connected in parallel with a light-emitting diode 13. The positive electrode of the battery 11 is connected to the negative terminal of the capacitor C2, and is also connected to the collector of a transistor Tr.1 and the emitter of a transistor Tr.2. The emitter of the transistor Tr.1 and the collector of the transistor Tr.2 are connected to the positive terminal of the capacitor C2 and the collector of a transistor Tr.3.

The emitter-collector path of the transistor Tr.3 is connected to a diode D1. The emitter of the transistor Tr.3 is connected to the positive terminal of capacitor C1, and capacitor C1 is connected in parallel with a light-emitting diode 14. The capacitor C1 is connected in parallel with the battery 11 through parallel circuits of the transistor Tr.3 and diode D1, and the transistors Tr.1 and Tr.2. The capacitor C1 will be referred to as a parallel capacitor hereinafter, and the capacitor C2 will be referred to as a series capacitor hereinafter.

In this embodiment, battery 11 is a storage battery of a voltage of 240 V. Each of the capacitors C1 and C2 preferably comprises a capacitor having a large capacity per unit volume, such as an electric double-layer type capacitance or a quasi capacitance, and more preferably comprises a large-capacity capacitor having a low resistance and a high output density. The capacitance of the capacitor can be determined in consideration of a balance with its occupation volume, and in this embodiment, the capacitors C1 and C2 preferably have a total capacitance of, e.g., 9 F or more.

The capacitors C1 and C2 may have an arrangement prepared by connecting a plurality of capacitors in series with each other. With this arrangement, the withstand voltage of each capacitor can be lowered.

The positive terminal of the power supply apparatus 1 is connected to the positive terminal of the series capacitor C2 and the collector of the transistor Tr.3. The negative terminal of the power supply apparatus 1 is connected to the negative electrode of the battery 11 and the negative terminal of the series capacitor C2. The positive and negative terminals of the power supply apparatus 1 are connected to the inverter 2 through a smoothing capacitor C3.

The transistor driving signal from the base drive circuit 7 is input to the bases of the transistors Tr.1, Tr.2, and Tr.3 so as to control the switching operations of the transistors. In the above-mentioned circuit, a DC reactor may be inserted between the inverter 2 and the power supply apparatus 1.

The light-emitting diodes 12, 13, and 14 emit light having light amounts corresponding to the terminal voltages of the battery 11 and the capacitors C1 and C2, respectively. Therefore, the light-emitting diodes are paired with phototransistors to constitute the sensors 9 and 10 for detecting the terminal voltages of the battery 11 and the capacitors C1 and C2.

Figure 2:
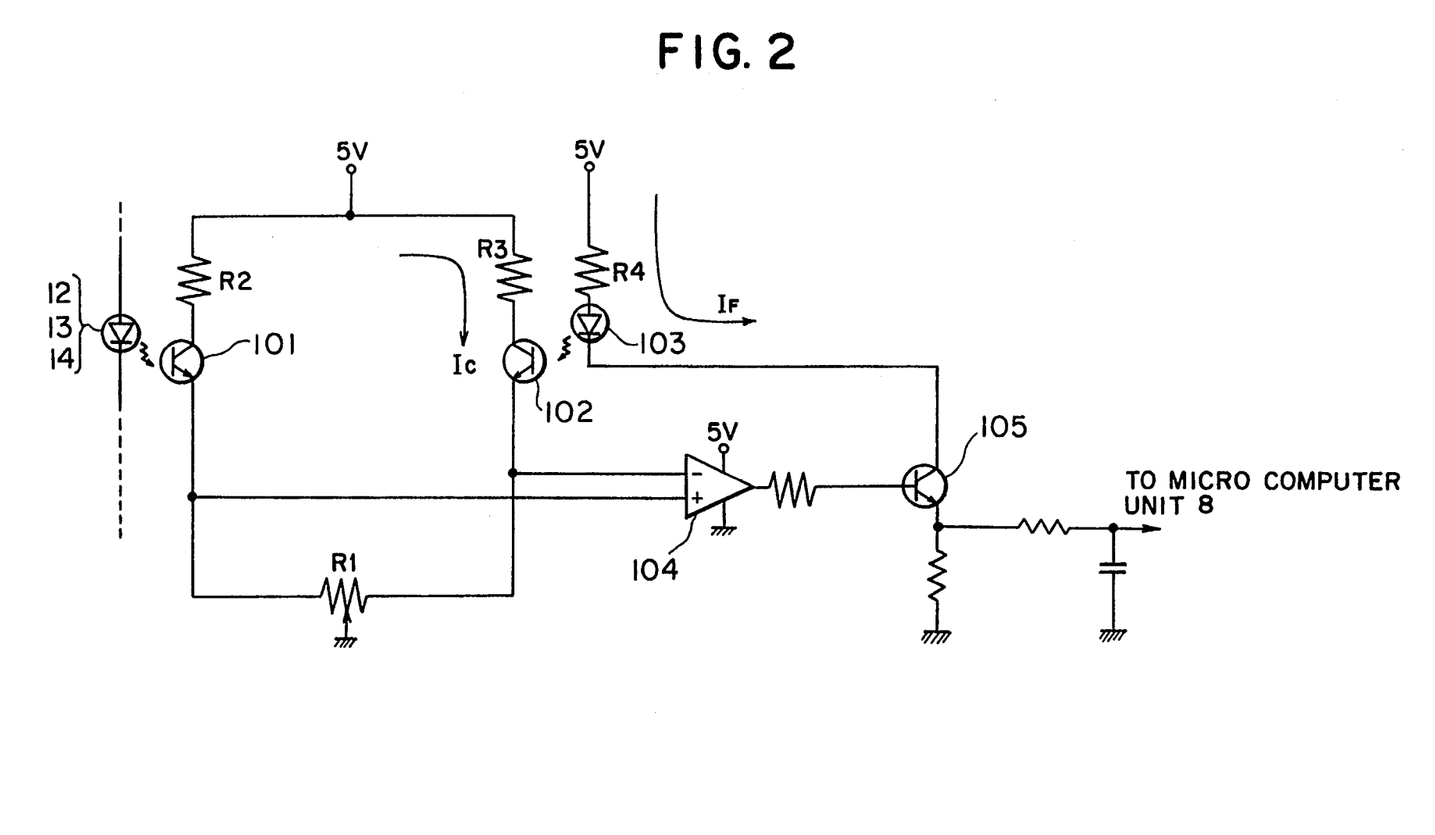
FIG. 2 is a circuit diagram of a terminal voltage sensor for a battery and a capacitor in the first embodiment.

FIG. 2 is a circuit diagram of the terminal voltage sensor for the battery and the capacitors in this embodiment. A series circuit of a phototransistor 101 and a resistor R2, and a series circuit of a phototransistor 102 and a resistor R3 are connected in parallel with each other through an adjusting resistor R1. The adjusting resistor adjusts the balance of voltages to be input to the inverting and non-inverting input terminals of an operational amplifier (to be described later). The resistors R2 and R3 are connected to a 5 V power supply, and the resistor R1 is grounded at its intermediate tap.

The emitters of the phototransistors 101 and 102 are respectively connected to the non-inverting an inverting terminals of an operational amplifier 104. The operational amplifier 104 operates as a differential amplifier (comparator), and its output terminal is connected to the base of a transistor 105.

The phototransistor 101 receives light from the light-emitting diode (12, 13, or 14) for detecting the terminal voltage. The phototransistor 102 receives light from a compensation light-emitting diode 103. The light-emitting diode 103 is connected to the 5 V power supply through a resistor R4, and is also connected to the collector of the transistor 105. A sensor output is extracted from the emitter of the transistor 105, and is supplied to the microcomputer 8. The terminal voltage sensor 9 for the battery 11 and the terminal voltage sensor 10 for the capacitors C1 and C2 have the circuit arrangement shown in FIG. 2.

A current flowing through the phototransistor 101 changes according to the light amount from the light-emitting diode for detecting the terminal voltage. A current $I_c$ lowing through the phototransistor 102 changes according to the light amount from the compensation light-emitting diode 103. Therefore, for example, when the terminal voltage of the battery 11 is lowered, the light emission amount of the light-emitting diode 12 is decreased accordingly, and the current flowing through the phototransistor 101 is also decreased. Thus, the voltage at the non-inverting terminal of the operational amplifier 104 is decreased, the output voltage of the operational amplifier 104 is decreased, and the base current of the transistor 105 is decreased. In this manner, a current $I_p$ lowing through the light-emitting diode 103 can be decreased to a level equivalent to that of the light-emitting diode 12. More specifically, the electrical and optical conditions of the two light-emitting diodes can be equally set. Therefore, when the phototransistors 101 and 102, and the light-emitting diodes 12 and 103 are selected to have equal characteristics, changes in characteristics over time and changes in temperature characteristics of the light-emitting diodes and the phototransistors cancel each other, and a sensor output compensated for these changes can be obtained.

By using this optical sensor, the terminal voltage of each of the battery 11 and the capacitors C1 and C2 can be detected in an electrically isolated form.

The operation of this embodiment will be described below with reference to FIGS. 3 to 9.

Figure 3:
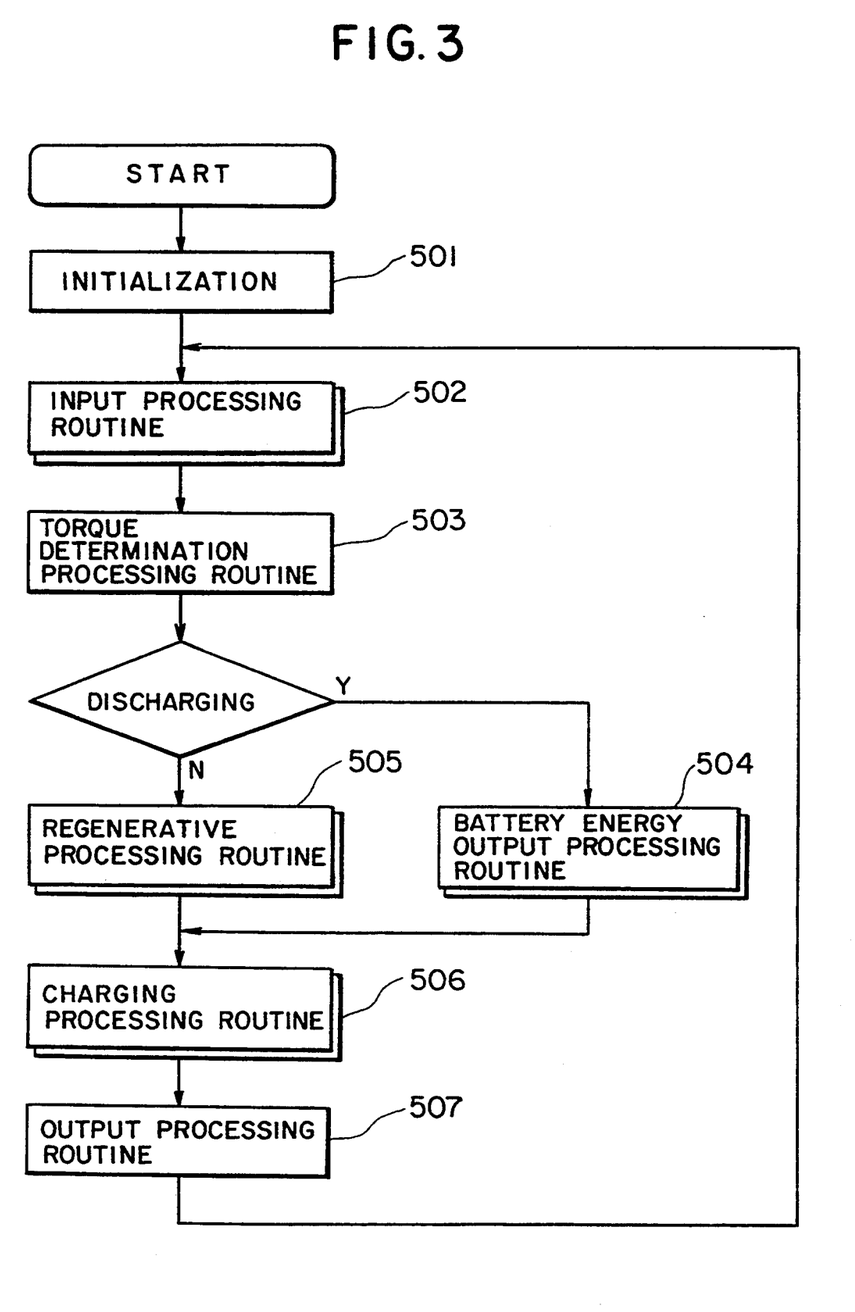
FIG. 3 is a flow chart showing an outline of an operation of the driving control circuit shown in FIG. 1.
Figure 4:
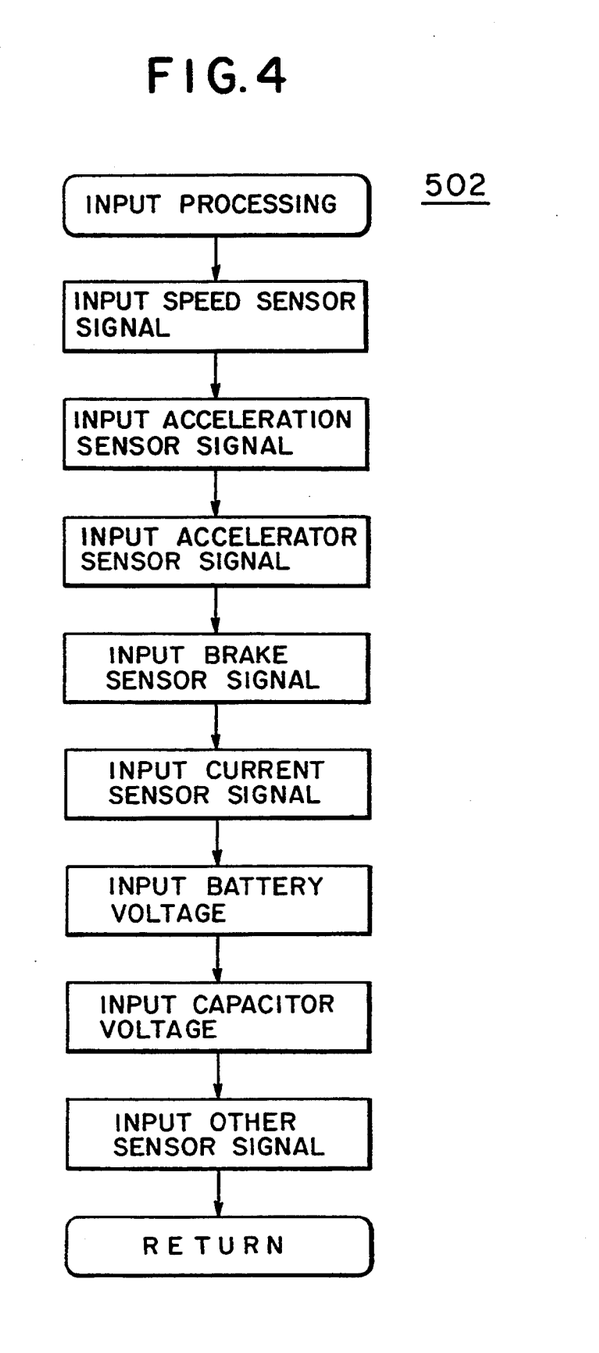
FIG. 4 is a flow chart showing an input processing routine in FIG. 3.

FIG. 3 is a flow chart showing a processing flow of the driving control circuit shown in FIG. 1. After initialization is executed (step 501), input processing is executed (step 502). In the input processing, as shown in FIG. 4, signals from various sensors are input to the microcomputer 8. At this time, signals from the terminal voltage sensor 9 for the battery 11 and the terminal voltage sensor 10 for the capacitors C1 and C2 are similarly read. Torque determination processing is executed based on the above-mentioned sensor signals (step 503).

The operation of this embodiment includes a discharging operation (step 504) in a steady traveling state and an acceleration state, and a regenerative operation (step 505) in a regenerative state.

Steady Traveling and Acceleration States

In a steady traveling state, since power consumption is small, the vehicle can be sufficiently driven by electric power from the battery 11. If the series capacitor C2 has been charged, it is discharged.

Figure 5:
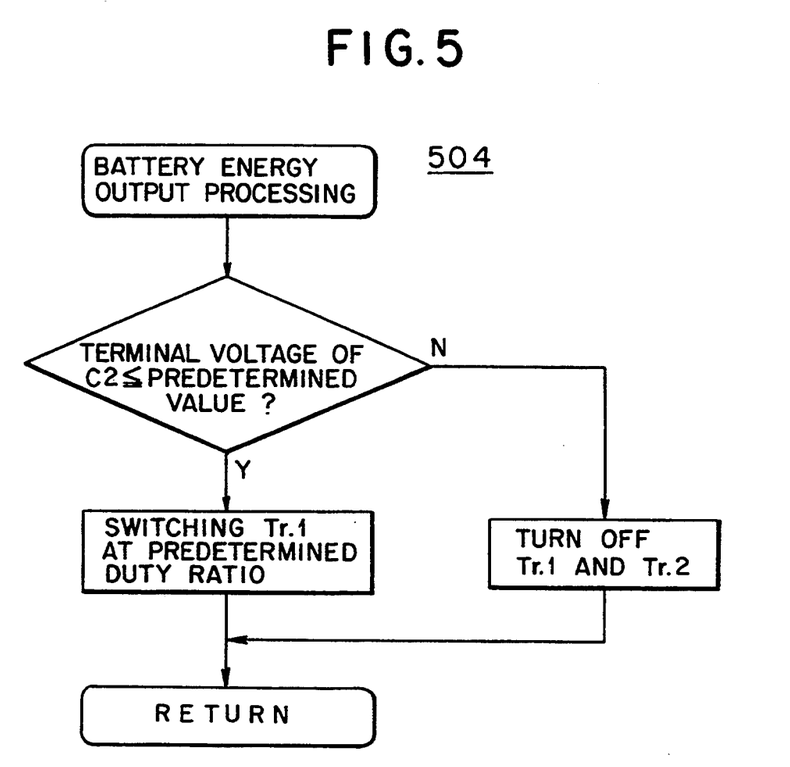
FIG. 5 is a flow chart showing a battery output processing routine in FIG. 3.

As shown in FIG. 5, when the microcomputer 8 receives a terminal voltage $V_{c2}$ of the series capacitor C2 from the sensor 10, it checks if the terminal voltage $V_{c2}$ is equal to or lower than a predetermined value (in this case, a potential difference 0). If the terminal voltage $V_{c2}$ is higher than the predetermined value, since it can be determined that the capacitor C2 has been charged, the microcomputer 8 turns off transistors Tr.1, Tr.2, and Tr.3 through the current waveform control circuit 6 and the base drive circuit 7 so as to discharge the series capacitor C2. On the other hand, when the terminal voltage $V_{c2}$ becomes equal to or lower than the predetermined value, the battery 11 is discharged.

When a required voltage exceeds the supply capability of the battery 11 in, e.g., an acceleration state, a current is supplied from the parallel capacitor C1 through the diode D1. At this time, the transistor Tr.1 is switched at a predetermined duty ratio, so that the discharging current from the battery 11 does not exceed a predetermined value $I_s$ (determined by battery deterioration characteristics). This is to prevent deterioration of the battery 11 by an excessive discharging current. In this case, transistor Tr.2 is turned on, and serves as a reflux diode.

Figure 8:
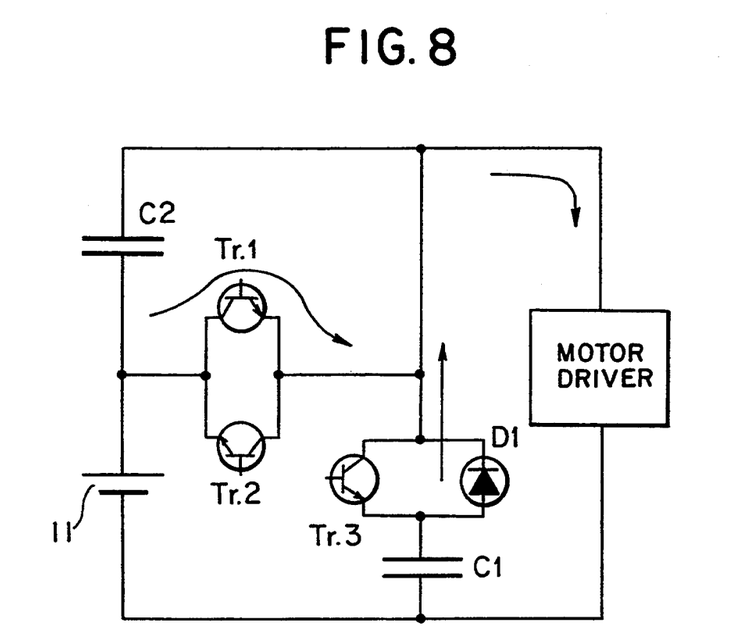
FIG. 8 is a diagram for explaining a discharging state of the first embodiment.

The above-mentioned current flow is shown in FIG. 8. A "motor driver" shown in FIG. 8 and FIGS. 9 and 10 (to be described later) indicates the inverter 2 and its control system in FIG. 1.

Note that the ON timing of transistor Tr.1 may be determined in accordance with the voltage $V_{c2}$, as described above. Alternatively, the ON timing of transistor Tr.1 may be determined in accordance with a terminal voltage $V_{c1}$ of capacitor C1 when, for example, it is determined that the voltage $V_{c1}$ is decreased at a constant rate. In this case, the voltage $V_{c2}$ has already been consumed, and capacitor C1 has begun to discharge. Furthermore, when the terminal voltage of capacitor C2 reaches a predetermined value, transistor Tr.3 may be turned on, and thereafter, transistor Tr.1 may be turned on at a timing when the terminal voltage of the capacitor C1 becomes equal to or lower than a predetermined value.

Regenerative State

When a regenerative operation is performed, the motor 3 operates as a generator, and electric power generated by the motor 3 is rectified through diodes of the inverter 2 and flows into the power supply apparatus 1. It is particularly important for the electric vehicle to store this electric power without wasting it.

When Regenerative Electric Power is Small (Regenerative Operation at Low Speed)

Figure 6:
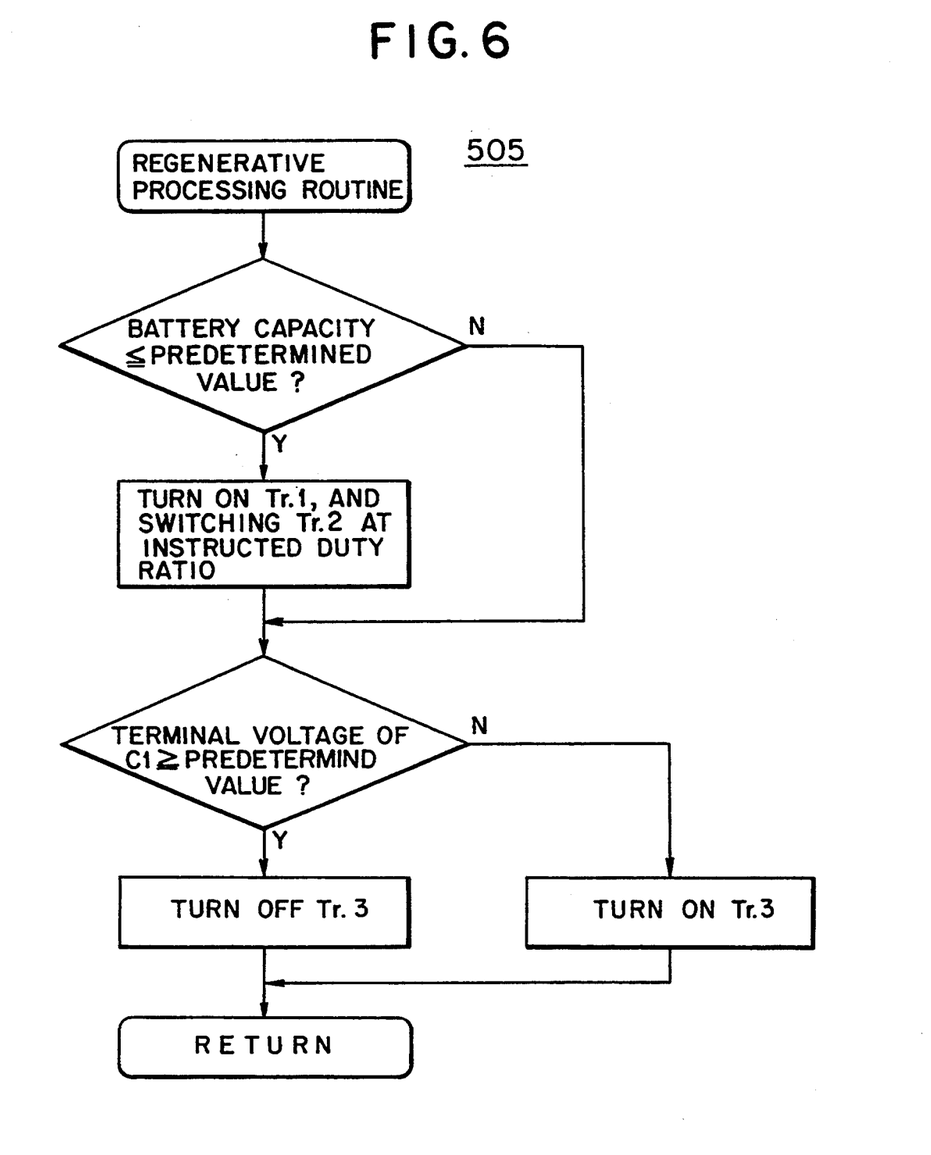
FIG. 6 is a flow chart showing a regenerative processing routine in FIG. 3.

In FIG. 6, the microcomputer 8 detects a terminal voltage $V_B$ of the battery 11 from the sensor 9. When the terminal voltage $V_B$ is equal to or lower than a predetermined value, the microcomputer 8 controls the base drive circuit 7 to generate driving signals so as to turn on transistor Tr.1 and to switch transistor Tr.2 at a predetermined duty ratio. Upon switching of the transistor Tr.2, the battery 11 can be charged with a current equal to or lower than the predetermined value. When the terminal voltage $V_B$ is higher than the predetermined value, the microcomputer inhibits the charging operation of the battery 11. In this embodiment, the predetermined value $V_B$ for determining whether or not the battery is charged is set to be a value obtained when the battery is sufficiently charged.

The microcomputer 8 fetches the terminal voltage $V_{c1}$ of the parallel capacitor C1 from the sensor 10. When the terminal voltage $V_{c1}$ is equal to or higher than a predetermined value, the microcomputer determines that the parallel capacitor C1 has been charged, and turns off the transistor Tr.3. When the terminal voltage $V_{c1}$ does not reach the predetermined value yet, the microcomputer turns on the transistor Tr.3 to store a regenerative current in the parallel capacitor C1.

When Regenerative Electric Power is Large (Regenerative Operation at High Speed)

When regenerative electric power beyond the charging capability of the battery 11 and the parallel capacitor C1 is generated, the transistors Tr.1, Tr.2, and Tr.3 are turned off, and the regenerative electric power is charged in the series capacitor C2. When the microcomputer 8 detects, based on the output from the sensor 10, that the terminal voltage of the capacitor C2 has reached the predetermined value, it outputs an instruction signal to the base drive circuit through the current waveform control circuit so as not to return the regenerative electric power to the power supply apparatus 1.

Figure 9:
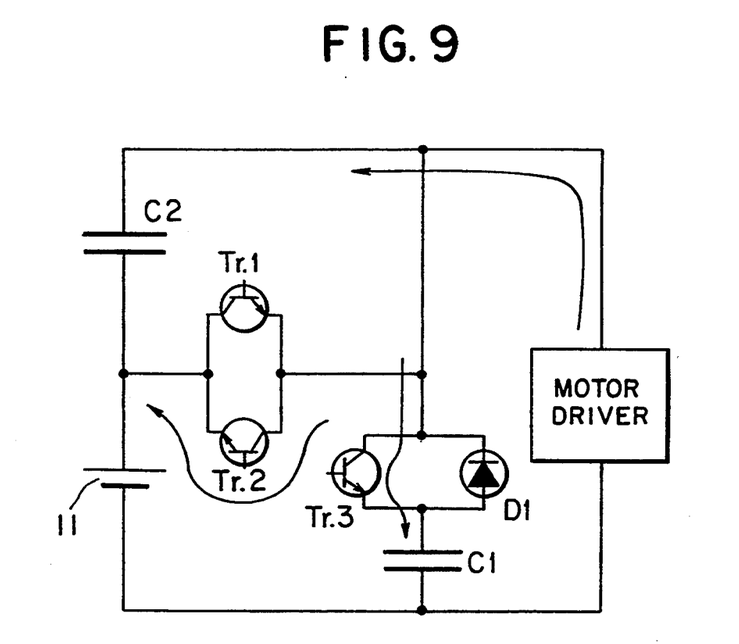
FIG. 9 is a diagram for explaining a regenerative state of the first embodiment.

The above-mentioned current flow is shown in FIG. 9.

Figure 7:
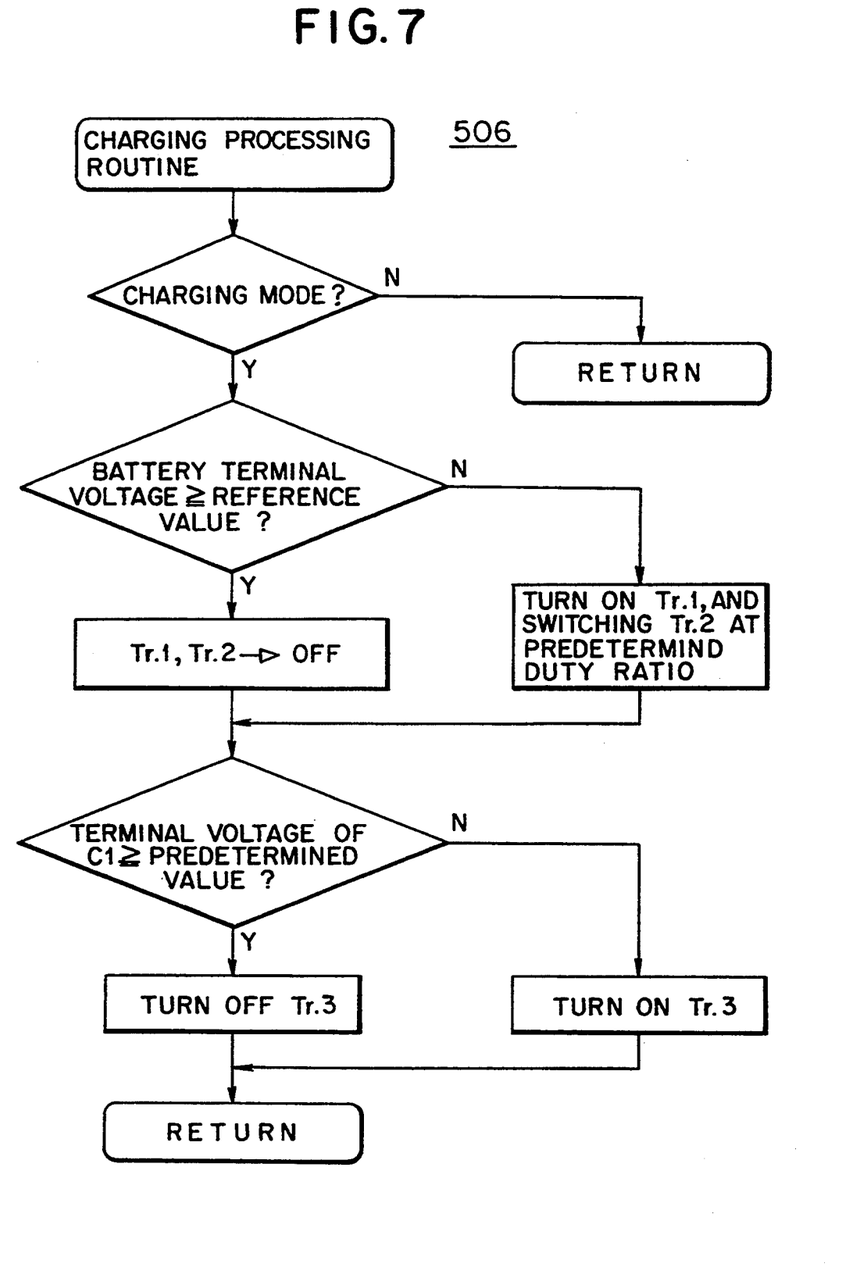
FIG. 7 is a flow chart showing a charging processing routine in FIG. 3.

FIG. 7 shows a charging processing routine for distributing the charge charged on the series capacitor C2 to the battery 11 and the parallel capacitor C1.

The microcomputer 8 checks if a charging mode is selected. In the charging mode, in the case of the electric vehicle, a charging operation is performed by an apparatus outside the vehicle. For example, a user sitting on a driver's seat selects a mode using a button switch. If the charging mode is selected, the microcomputer checks if the battery terminal voltage $V_B$ from the sensor 9 is equal to or higher than a reference value. If the battery terminal voltage is equal to or higher than the reference value, since the charging operation cannot be performed, the microcomputer turns off transistors Tr.1 and Tr.2. If the battery terminal voltage is lower than the reference value, the microcomputer turns on transistor Tr.1, and switches the transistor Tr.2 at a predetermined duty ratio. With this operation, the battery 11 is charged with a current equal to or lower than a predetermined current.

The microcomputer 8 fetches the terminal voltage $V_{c1}$ of the parallel capacitor C1 from the sensor 10. When the terminal voltage $V_{c1}$ is equal to or higher than the predetermined value, since the charging operation cannot be performed, the microcomputer turns off transistor Tr.3. When the terminal voltage $V_{c1}$ does not reach the predetermined value yet, the microcomputer turns on transistor Tr.2 to store a charge on the parallel capacitor C1. When the vehicle stands still, all the transistors are OFF.

Figure 10:
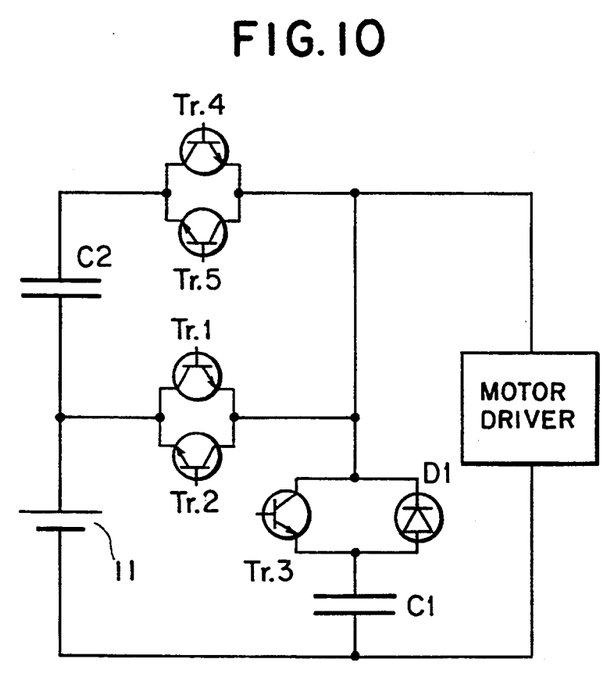
FIG. 10 is a schematic circuit diagram showing a second embodiment of the present invention.

FIG. 10 is a schematic circuit diagram showing a second embodiment of the present invention. It should be noted that the light-emitting diodes 12, 13, and 14, and the sensors 9 and 10 for detecting a terminal voltage are arranged as in the first embodiment shown in FIG. 1 although they are not shown in FIG. 10.

In this embodiment, transistors Tr.4 and Tr.5 are connected between the positive terminal of the series capacitor C2 and the motor driver. The collector and emitter of transistor Tr.4 are respectively connected to the emitter and collector of the transistor Tr.5. The collector of transistor Tr.4 is connected to the positive terminal of the series capacitor C2, and the emitter thereof is connected to the motor driver. Note that transistors Tr.4 and Tr.5 may be arranged as a solid-state relay or may be replaced with a mechanical relay. In this embodiment, the order of use of the series and parallel capacitors can be ignored. The operation of this embodiment is as follows.

When Vehicle Stands Still

All the transistors are OFF.

Acceleration and Steady Traveling States

When the terminal voltage of the series capacitor C2 is equal to or higher than a predetermined value, the microcomputer 8 turns on both transistors Tr.4 and Tr.5 to discharge the series capacitor C2 first. Upon completion of discharging of the series capacitor C2 (i.e., when the terminal voltage becomes equal to or lower than the predetermined value), the microcomputer turns off transistors Tr.4 and Tr.5, and thereafter, the battery 11 discharges a current equal to or lower than a predetermined value $I_s$ by switching transistor Tr.1. In addition, a current is supplied from the parallel capacitor C1 through the diode D1. In this manner, even in an acceleration state requiring large electric power, the current discharged from the battery 11 can be suppressed within the predetermined value $I_s$. When the transistor Tr.1 is switched, transistor Tr.2 is turned on, and serves as a reflux diode. In the second embodiment, no serious problem will be posed even when the predetermined value for the capacitor C2 is increased to some extent.

Steady Traveling State

After the series capacitor C2 is discharged, a current from the battery 11 is supplied through transistor Tr.2. In this case, as has already been described above, transistor Tr.1 is switched at a predetermined duty ratio, thereby limiting the current flowing out from the battery 11 to be equal to or lower than a predetermined value.

Regenerative Operation at Low Speed

The microcomputer detects the terminal voltage $V_B$ of the battery 11 from the sensor 9. When the terminal voltage $V_B$ is equal to or lower than a predetermined value, the microcomputer controls the base drive circuit 7 to generate the driving signals so as to turn on transistor Tr.1, and to switch transistor Tr.2 at a predetermined duty ratio. When the terminal voltage $V_B$ is higher than the predetermined value, the microcomputer inhibits the charging operation of the battery 11.

The microcomputer 8 fetches the terminal voltage $V_{c1}$ of the parallel capacitor C1 from the sensor 10. When the terminal voltage $V_{c1}$ is equal to or higher than a predetermined value, the microcomputer determines that the parallel capacitor C1 has been charged, and turns off transistor Tr.3. When the terminal voltage $V_{c1}$ does not reach the predetermined value yet, the microcomputer turns off transistor Tr.3 to store a regenerative current on the parallel capacitor C1. When the series capacitor C2 is sufficiently charged, the microcomputer 8 turns off transistors Tr.4 and Tr.5; otherwise, it turns on these transistors. When transistor Tr.4 is turned on, transistor Tr.2 is turned off.

Regenerative Operation at High Speed

The microcomputer turns off transistors Tr.1, Tr.2, and Tr.3, and turns on transistors Tr.4 and Tr.5 to charge the series capacitor C2. When the microcomputer 8 detects, based on the output from the sensor 10, that the terminal voltage of the capacitor C2 has reached the predetermined value, it controls not to return regenerative electric power to the power supply apparatus 1.

Figure 11:
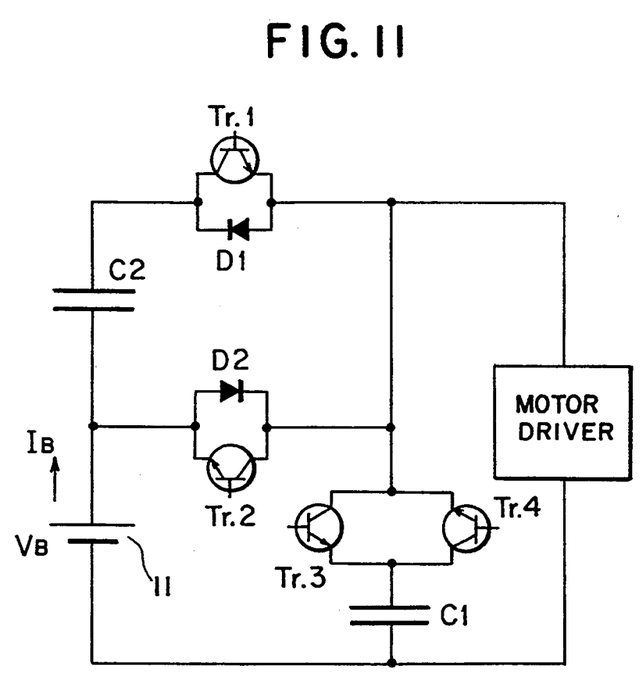
FIG. 11 is a schematic circuit diagram showing a third embodiment of the present invention.

FIG. 11 is a schematic circuit diagram of a third embodiment of the present invention. In FIG. 11, the light-emitting diodes 12, 13, and 14, and the sensors 9 and 10 are not shown for the sake of simplicity.

In FIG. 11, the positive terminal of the series capacitor C2 is connected to the motor driver through a parallel circuit of transistor Tr.1 and a diode D1, and the positive electrode of the battery 11 and the negative terminal of the series capacitor C2 are connected to the motor driver through a parallel circuit of transistor Tr.2 and a diode D2. The positive terminal of the parallel capacitor C1 is connected to the motor driver through a parallel circuit of the transistors Tr.3 and Tr.4. In this embodiment, a current sensor (not shown) for detecting a current flowing out from tile battery 11, and a sensor (not shown) for detecting a voltage across the motor driver are arranged. The operation of this embodiment will be described below.

Figure 12:
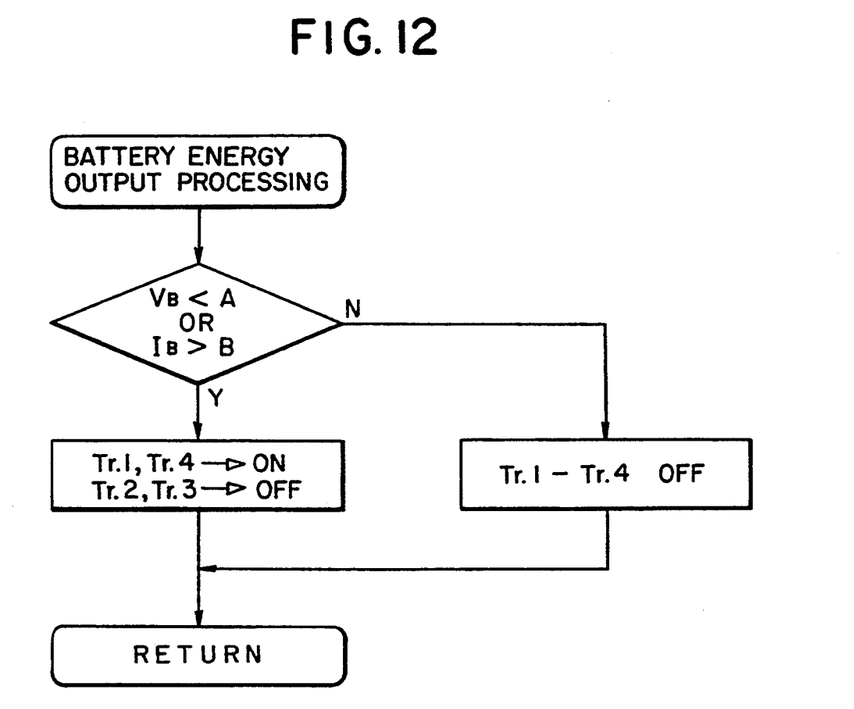
FIG. 12 is a flow chart showing a battery output processing routine of the third embodiment.

FIG. 12 is a flow chart showing a discharging process of this embodiment. The microcomputer 8 fetches the battery terminal voltage $V_B$ from the sensor 9, and a battery output current $I_B$ from the current sensor. When the voltage $V_B$ is lower than a predetermined value A, or when the current $I_B$ is higher than a predetermined value B, the microcomputer turns on transistors Tr.1 and Tr.4, and turns off transistors Tr.2 and Tr.3. With this operation, a current can be supplied from the capacitors C1 and C2, and the lead on the battery 11 can be eliminated. Since other cases can be coped with by only the battery 11, transistors Tr.1, Tr.2, Tr.3, and Tr.4 are turned off.

Figure 13:
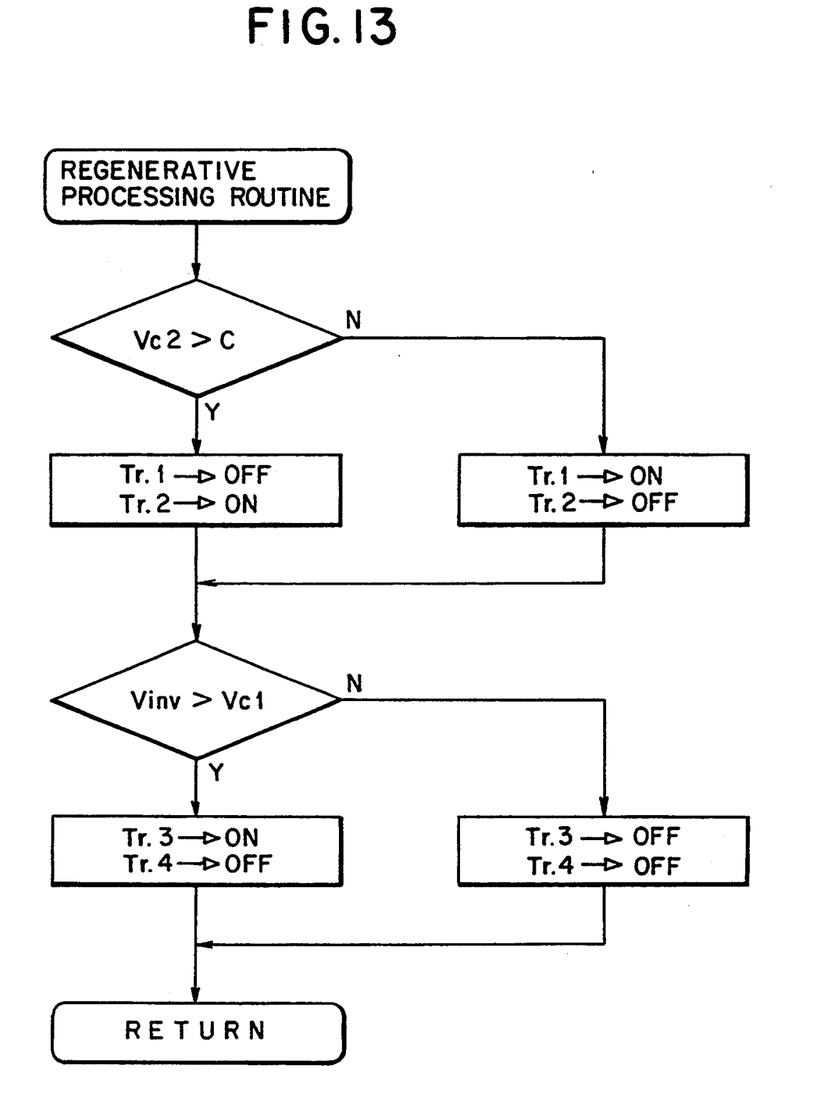
FIG. 13 is a flow chart showing a regenerative processing routine of the third embodiment.

FIG. 13 is a flow chart showing a regenerative process of this embodiment. In FIG. 13, the microcomputer 8 fetches the terminal voltage $V_{c2}$ of the series capacitor C2 from the sensor 10, and compares it with a predetermined value C.

When $V_{c2} > C$, this means that the series capacitor C2 has been sufficiently charged. The microcomputer turns off transistor Tr.1, and turns on transistor Tr.2. Thus, a regenerative current flows into the battery 11 through transistor Tr.2. Note that the magnitude of a current flowing into the battery 11 may be limited by switching the transistor Tr.2 at a predetermined duty ratio.

When $V_{c2} \leq C$, the microcomputer turns on transistor Tr.1, and turns off transistor Tr.2. Thus, the battery 11 is disconnected from the motor driver, and the series capacitor C2 is charged through the diode D1.

Furthermore, the microcomputer 8 fetches a voltage $V_{inv}$ of the motor driver and the terminal voltage $V_{c1}$ of the parallel capacitor C1, and compares the two voltages.

When $V_{inv} \leq V_{C1}$, the microcomputer turns off both transistors Tr.3 and Tr.4.

When $V_{inv} > V_{c1}$, the microcomputer turns on transistor Tr.3, and turns off transistor Tr.4.

In each of the embodiments of the present invention, a motor drive control of an electric vehicle has been described. However, the present invention is not limited to an electric vehicle, but may be applied to any other apparatus which drives motors using batteries.

As has been described in detail above, according to the electric vehicle described in each embodiment of the present invention, the terminal voltage of the battery is detected to limit input and output currents of the battery, thereby preventing deterioration of the battery.

Furthermore, according to the electric vehicle described in each embodiment of the present invention, the terminal voltage of a large-capacity capacitor is detected to limit an input current for a sufficiently charged capacitor, thereby protecting the capacitor, and prolonging the service life of the power supply apparatus.

The preferred embodiments described in this specification are merely examples, and the present invention is not limited to these. As preferred embodiments, various other changes and modifications may be made without departing from the spirit and scope of the invention claimed later.

More specifically, the scope of the invention is clarified by the appended claims, and all the modifications included in these claims are included in the present invention.

What is claimed is:

1. An electric vehicle for generating at least part of a driving force by a motor, comprising:
    a driving circuit for driving said motor;
    a power source unit for supplying electrical power to said motor, said power source unit being regeneratively charged by said motor;
    a large-capacity capacitor that stores an electrical charge and supplies electrical power to said motor, said large-capacity capacitor being regeneratively charged by said motor;
    a first sensor for detecting a voltage of said power source unit;
    a second sensor for detecting a voltage of said large-capacity capacitor; and
    means for distributing a regenerative power of said motor to said large-capacity capacitor and said power source unit, an amount of regenerative power distributed to said large-capacity capacitor and an amount of regenerative power distributed to said power source unit being determined in response to voltage detected by said first sensor and said voltage detected by said second sensor, so as to regeneratively charge said power source unit and said large-capacity capacitor.

2. The electric vehicle of claim 1, wherein said distributing means comprises switching means.

3. The electric vehicle of claim 2, wherein said switching means is operatable at a predetermined duty ratio.

4. The electric vehicle of claim 1, wherein said distributing means comprises a transistor.

5. An electric vehicle for generating at least part of a driving force by a motor, comprising:
    a driving circuit for driving said motor;
    a power source unit for supplying electrical power to said motor, said power source unit being regeneratively charged by said motor;
    a large-capacity capacitor that supplies electrical power to said motor, said large-capacity capacitor being regeneratively charged by said motor;
    a first sensor for detecting a first voltage of said large-capacity capacitor;
    a second sensor for detecting a second voltage of said power source unit;
    means for limiting a regenerative power from said driving circuit in response to said detected first voltage and said detected second voltage when said detected first voltage is greater than a first predetermined value and said detected second voltage is greater than a second predetermined value; and
    means for distributing an electrical power from said driving circuit to said large-capacity capacitor and said driving circuit, an amount of electrical power distributed to said large-capacity capacitor and an amount of electrical power distributed to said driving circuit being determined in response to said detected first voltage and said detected second voltage.

6. The electric vehicle of claim 5, wherein said distributing means comprises switching means.

7. An electric vehicle for generating at least part of a driving force by a motor, comprising:
    a driving circuit for said motor;
    a source of electrical power;
    a first large-capacity capacitor connected in series with said source of electrical power;
    a first sensor for detecting a terminal voltage of said first large-capacity capacitor;
    a second large-capacity capacitor connected in parallel with said source of electrical power;
    a second sensor for detecting a terminal voltage of said second large-capacity capacitor;
    first current-limiting means for limiting a current flowing from said driving circuit to said first large-capacity capacitor when said terminal voltage detected by said first sensor is not less than a predetermined value; and
    second current-limiting means for limiting a current flowing from at least one of said driving circuit, said first large-capacity capacitor, and said source of electrical power into said second large-capacity capacitor when said terminal voltage detected by said second sensor is not less than a predetermined value.

8. The electric vehicle of claim 1, wherein said large-capacity capacitor comprises an electric double-layer capacitor.

9. The electric vehicle of claim 1, wherein said large-capacity capacitor comprises a plurality of electric double-layer capacitors coupled in series with each other.

10. The electric vehicle of claim 1, wherein said large-capacity capacitor comprises a quasi capacitance type capacitor.

11. The electric vehicle of claim 7, wherein said large-capacity capacitor comprises an electric double-layer capacitor.

12. The electric vehicle of claim 7, wherein said large-capacity capacitor comprises a plurality of electric double-layer capacitors coupled in series with each other.

13. The electric vehicle of claim 7, wherein said large-capacity capacitor comprises a quasi capacitance type capacitor.

14. The electric vehicle of claim 1, wherein said power source unit comprises a rechargeable battery.

15. The electric vehicle of claim 5, wherein said power source unit comprises a rechargeable battery.

16. An apparatus for generating at least part of a driving force by a motor, comprising:
    means for driving said motor;
    means for supplying electrical power to said motor, said supplying means being regeneratively charged by said motor;
    means for smoothing said electrical power supplied by said supplying means, said smoothing means being connected between said supplying means and said driving means;
    means for storing an electrical charge, said storing means supplying electrical power to said motor, said storing means being regeneratively charged by said motor;
    means for detecting a voltage of said storing means; and
    means for distributing a regenerative power of said motor to said storing means and said supplying means, an amount of regenerative power distributed to said storing means and an amount of regenerative power distributed to said supplying means being determined in response to said voltage detected by said detecting means, so as to regeneratively charge said supplying means and said storing means.

17. The apparatus of claim 16, wherein said supplying means comprises a rechargeable battery.

18. The electric vehicle of claim 5, wherein said limiting means is arranged in said driving circuit.

19. The apparatus of claim 16, wherein said storing means comprises a large-capacity capacitor.

20. The apparatus of claim 16, wherein said storing means comprises:

a first capacitor connectable in series with said source of electrical power; and a second capacitor connectable in parallel with said source of electrical power; and, said detecting means comprises:

a first sensor for detecting a voltage of said first capacitor; and a second sensor for detecting a voltage of said second capacitor.

21. The electric vehicle of claim 1, further comprising means for smoothing said electrical power supplied by said power source unit, said smoothing means being connected between said power source unit and said driving circuit.

22. The electric vehicle of claim 5, further comprising means for smoothing said electrical power supplied by said power source unit, said smoothing means being connected between said power source unit and said driving circuit.

* * * * *